United States Patent [19]

Rao et al.

[11] 4,456,913

[45] Jun. 26, 1984

[54] SUB-ARRAY POLARIZATION CONTROL FOR A MONOPULSE DOME ANTENNA

[75] Inventors: B. Rama Rao, Lexington; Leon Susman, Sudbury, both of Mass.

[73] Assignee: Sperry Corporation, New York, N.Y.

[21] Appl. No.: 364,143

[22] Filed: Mar. 31, 1982

[51] Int. Cl.[3] ........................ H01Q 3/00; H01Q 21/06; H01Q 21/24; H04B 7/10

[52] U.S. Cl. .................................... 343/361; 343/372; 343/754

[58] Field of Search .................. 343/100 SA, 100 PE, 343/854, 754, 361, 372

[56] References Cited

U.S. PATENT DOCUMENTS 4,010,471 9/1983 Smith ................................ 343/754

*Primary Examiner*—Theodore M. Blum

*Attorney, Agent, or Firm*—Howard P. Terry; Seymour Levine

[57] ABSTRACT

A dome antenna with cross polarization compensation for reducing cross polarization induced monopulse tracking errors controls the polarization at the elements of the feed array to reduce the cross-polarization component in a far field radiation pattern of the antenna. Cross-polarization components at each element in the feed array for a linearly polarized plane wave incident at a predetermined direction to the dome are determined and each element is oriented to be polarized orthogonally to the cross-polarized component at that element.

5 Claims, 17 Drawing Figures

SUB-ARRAY POLARIZATION CONTROL FOR A MONOPULSE DOME ANTENNA

BACKGROUND OF THE INVENTION

1. Field of the Invention

The subject invention pertains to the art of antennas and specifically to a polarization controlled feed array for a dome lens antenna.

2. Description of the Prior Art

Dome antenna systems, such as that disclosed in U.S. Pat. No. 3,755,815, issued Aug. 28, 1973 to Stangel et al and assigned to the assignee of the present invention, achieve hemispherical scan coverage with a single active planar phased-array feeding a dome shaped lens. This novel antenna design offers a number of significant advantages over conventional multifaced planar arrays including: substantially reduced cost; reduced complexity; and increased scan coverage, having greater than hemispheric scan capabilities. This dome antenna, however, exhibits undesirable cross polarization characteristics created by the depolarizing effects of the conformal surface of the dome shaped lens. This problem is exacerbated by the variation of the refractive index of the dome as a function of elevation angle. Additionally, the distributive source characteristics of the feed system of the lens provides an illumination which varies with scan angle. These factors contribute to the polarization distortion realized by a dome antenna system. When the feed array is designed for monopulse operation, the cross-polarized components in the far-field radiation pattern, generated by this polarization distortion and depolarization effects of the target, fill the central null in the monopulse difference pattern, thereby degrading the angular tracking accuracy of the radar system. To provide monopulse radar high precision tracking, with the dome antenna system, it is necessary to substantially eliminate the null filling caused by the cross-polarization components.

One proposed solution to the problem introduces independent polarization phase and amplitude control in each element of the feed array. For dome antenna systems, the cost of implementing such a scheme is prohibitive, requiring two phase shifters (one for each polarization) and a pre-programmed antenuator for each element in the array, which may number over a thousand. Another proposal introduces appropriate amplitude weighting to the elements for each scan angle to reduce the cross-polarization level in the antenna difference pattern. This method is also complex and expensive.

SUMMARY OF THE INVENTION

A feed array for a dome antenna in accordance with the principles of the present invention provides polarization compensation as a function of scan angle to reduce polarization induced monopulse tracking errors. The polarization of each element in the feed array is adjusted at each scan angle to reduce the cross polarized component in the far field radiation pattern of the antenna for that scan angle. During the transmission interval, each element in the feed array is excited with a polarization that is orthogonal to the polarization component received at the element when the dome aperture is illuminated by a wave having a polarization substantially in alignment with the undesired cross polarization component in the far field. Feed array cross polarization components for each scan angle may be determined by illuminating a region of the dome aperture corresponding to the selected scan angle with a plane wave having the undesired polarization and mapping the field onto the plane of the feed array; the polarization of each element is there adjusted to be perpendicular to this projected cross polarization component. A Faraday rotator, controlled by a pre-program polarization control unit, is placed in each antenna element of the feed array to provide the required polarization variation. The feed array may be divided into sub-arrays and the polarization of the elements therein oriented substantially in alignment with the polarization of the center element thereof. This permits the Faraday rotators in all the elements of each sub-array to be controlled by a single polarization control, thereby reducing the cost and complexity of the polarization control circuitry.

BRIEF DESCRIPTION OF THE DRAWINGS

FIGS. 3*a* through 3*h* are illustrations of the principle and cross polarization components on the surface of the dome shaped lens for a monopulse dome antenna system.

DESCRIPTION OF THE PREFERRED EMBODIMENTS

Figure 1:
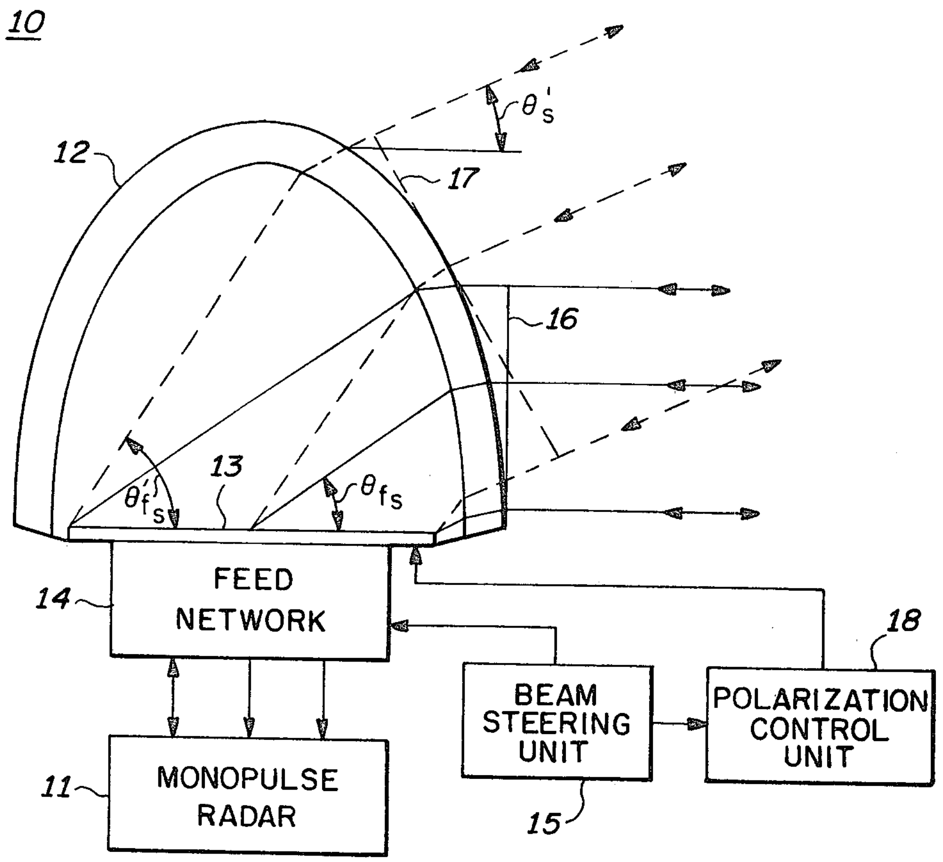
FIG. 1 is a schematic diagram of a polarization control dome antenna with effective apertures for two scan angles indicated thereon.
Figure 2C:
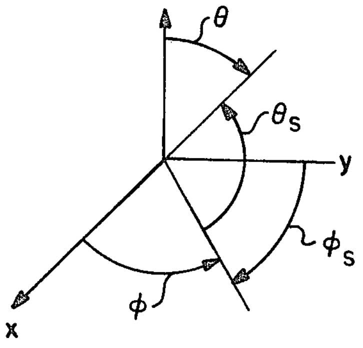
FIGS. 2*a* to 2*c* are representative of an orthogonal coordinate system in the feed array aperture plane projected on to the effective aperture plane of the dome antenna for a selected elevation scan angle.
Figure 2A:
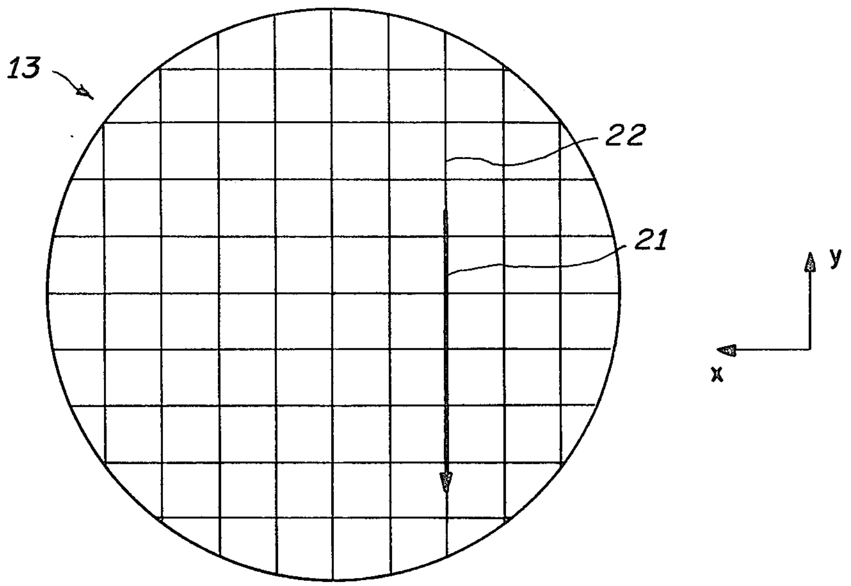
Figure 2B:
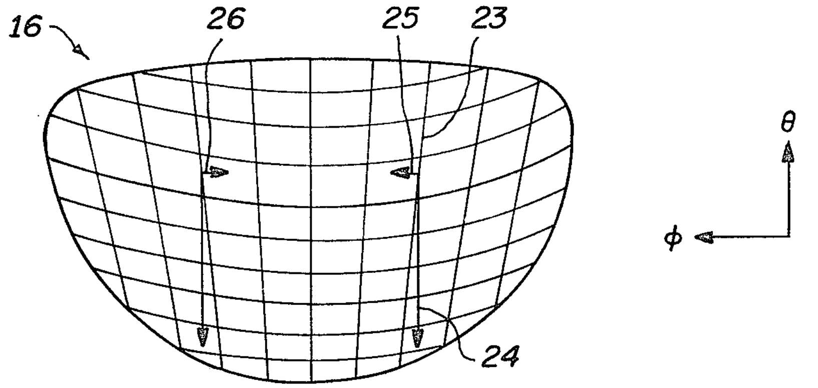
Figure 3D:
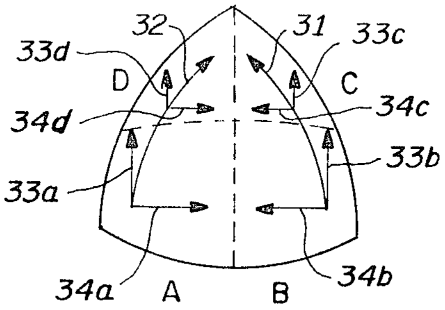
Figure 3H:
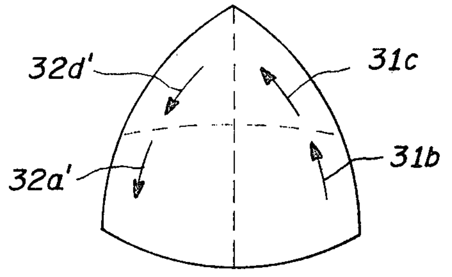
Figure 3B:
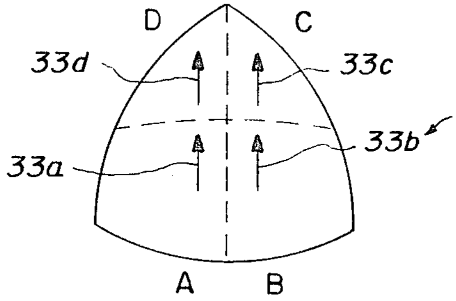
Figure 3C:
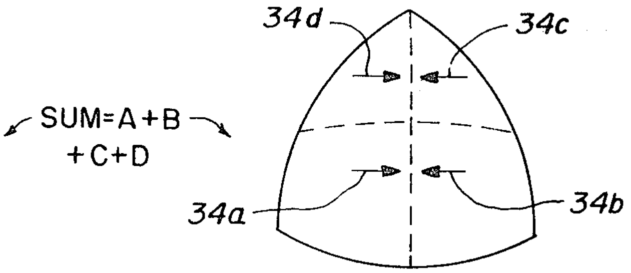
Figure 3D:
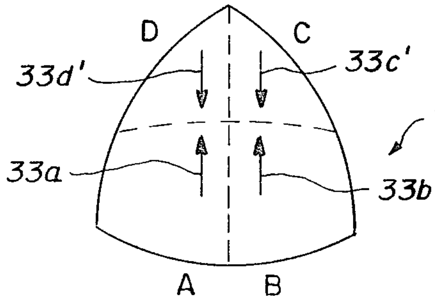
Figure 3E:
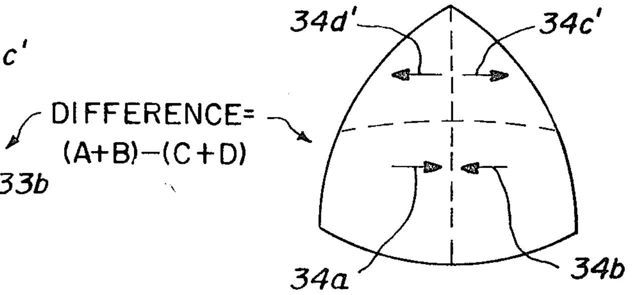
Figure 3F:
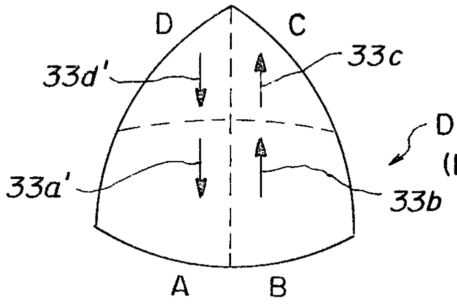
Figure 3G:
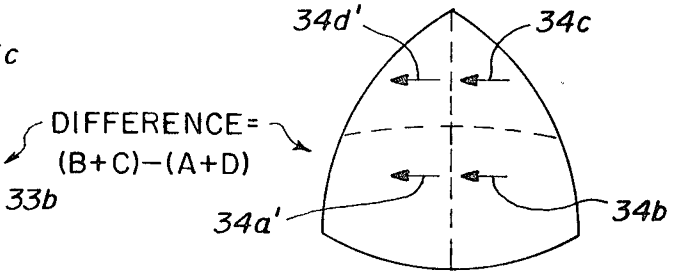
Figure 4A:
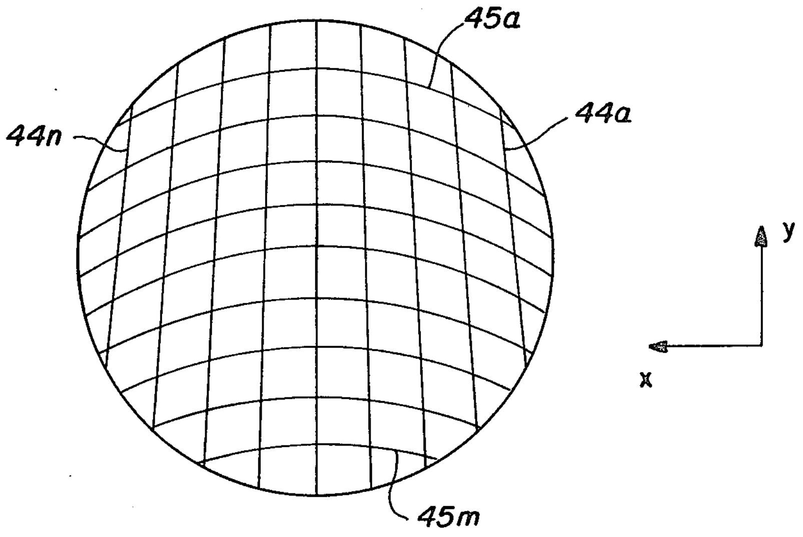
FIGS. 4*a* and 4*b* illustrate the projection of a linear orthogonal grid in the effective aperture plane of the dome antenna on to the plane of the feed array for a selected elevation angle.
Figure 4B:
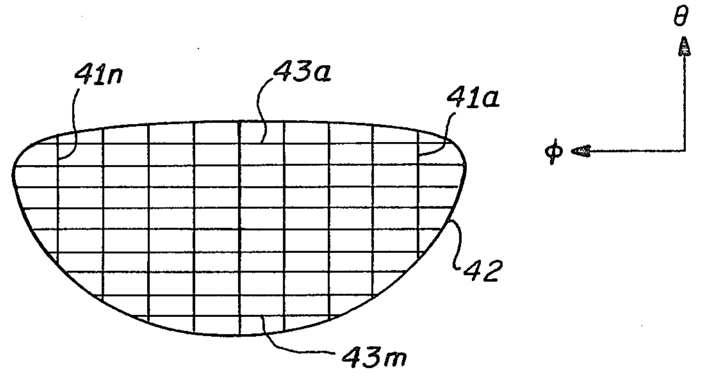

Referring to FIG. 1 a polarization compensated dome antenna system 10 for utilization with a monopulse radar tracker 11 may comprise a dome 12 having a refractive index that varies as a function of the elevation angle. a feed array 13, excited by the monopulse radar 11 via a feed network 14, illuminates the dome 12 at azimuth scan angles $\phi_{fs}$ and elevation scan angles $\theta_{fs}$ selected by a beam steering unit 15. In FIG. 1 only the elevation scan angles $\theta_{fs}$ are indicated. Since the refractive index of the some varies with elevation angle each ray of a beam from the feed array at an elevation angle $\theta_{fs}$ is refracted by the dome at an angle of refraction which varies in accordance with this refractive index variation. This variation in the refractive index and the shape of the dome provides a beam in space at an elevation angle $\theta_s$. The geometrical shape of the dome, however, causes a linearly polarized wave incident thereto to exhibit a distorted polarization pattern in the plane of an effective dome antenna aperture 16 upon emerging from the dome 12. When the feed array beam is scanned in elevation, as for example to an elevation angle $\theta_{fs}$ the illumination of the dome 12 by the radiation from the feed array aperture 13 establishes an effective dome antenna aperture plane 17 wherein the polarization distortion differs from that of the distortion in the plane 16. Though the dome is symmetrical in the azimuthal plane, polarization projections thereon vary with azimuth scan angle, thus causing the polarization distortion to vary also as a function of the azimuth scan angle $\phi_{fs}$. Consequently, the polarization of the feed array is controlled by the polarization control unit 18 as a function of the elevation and azimuth scan angles to compensate for the polarization distortion caused by the dome 12.

In FIG. *2a* a grid in the plane of the feed array aperture formed by sets of lines parallel to the X and Y axis of the feed array plane 13 are shown, while FIG. *2b* is the projection of this grid onto the effective aperture plane 16 for scan angles $\theta_s=0°$, $\phi_s=90$ for a dome having a height of 251.5 cm, a base radius of 143.5 cm and a feed array with a radius of 108 cm. FIG. *2c* illustrates the coordinate system to be used throughout this specification. A field linearly polarized along a line of the grid in the feed array aperture plane 13, as for example the polarization vector 21 along the line 22, projects along a corresponding curved line, for this example the line 23, in the effective aperture plane 16. This distortion of the polarization generates a polarization vector that may be resolved into orthogonal components: a principle component 24 parallel to the plane of incidence to the effective aperture, and a cross polarized component 25 perpendicular to the plane of incidence.

FIGS. *3a* through *3h* represent polarization projections on the dome surface of a linearly polarized, circular monopulse feed array for scan angles $\theta_S=\phi_S=0°$. A linearly polarized field on a feed array appears curved when projected on the surface of the dome as represented by the polarization vectors 31, 32 in FIG. *3a*. If the monopulse feed array is circular the projection of the array on the surface of the dome is triangularly shaped as are the four quadrants of the array, labeled A, B, C, and D in FIG. *3a*. The polarization vectors 31, 32 may be resolved into two orthogonal components in each quadrant, a principal component 33*a* through 33*d* and a cross-polarization component 34*a* through 34*d*. It should be noted that the cross polarized components are in phase opposition in the horizontally adjacent quadrants, as indicated by polarization vectors 25, 26 in FIG. *2b* and the polarization vectors 34*a*, 34*b* and 34*c*, 34*d* in FIG. *3a*.

A monopulse sum pattern is obtained by adding the contributions from the quadrants A, B, C, and D. As shown in FIG. *3b*, the principal polarized components 33*a*, 33*b*, 33*c*, and 33*d* add in phase, giving rise to a maximum in the boresight direction, while, as shown in FIG. *3c* the cross polarized components 34*a* and 34*d* are in phase opposition to the cross polarized components 34*b* and 34*c* giving rise to a null in the boresight direction. A vertical difference pattern is formed by taking the difference (A+B)−(C+D). As shown in FIG. *3d*, the polarization components 33*c'* and 33*d'* are in phase opposition with the polarization components 33*a* and 33*b*, while as shown in FIG. *3e*, the cross polarized components 34*a* and 34*c'* are in phase opposition with 34*b* and 34*d'*, hence the difference pattern for both the principle and cross polarization components exhibit a null in the boresight direction.

A horizontal difference pattern is formed by taking the difference (B+C)−(A+D). As shown in FIG. *3f*, the principle polarization components 33*a'* and 33*d'* are a phase opposition to the principle polarization components 33*b* and 33*c*, thus establishing a null in the boresight direction; while the cross polarization components 34*a'*, 34*b*, 34*c*, and 34*d'* are in phase and form a maximum in the boresight direction. It is this maximum in the antenna horizontal difference pattern that causes the monopulse tracking errors. If the tracked target is non-depolarizing, the polarization of the signal back scattered by the target is the same as the incident polarization; and the received resultant polarization 32*a'* is substantially colinear with the received resultant polarization 32*d'* as are the resultant polarizations 31*b* and 31*c*, as shown in FIG. *3h*. The polarization 32*a'*, and 32*d'*, however, are in phase opposition with the polarizations 31*b* and 31*c*, thus little null filling results. Generally, however, the scattered signals from a radar target exhibits polarizations that differ from the polarization of the incident signal. This depolarization of the echo signal, coupled with the polarization distortion created by the dome, reorients the received resultant polarizations and causes the tracking null to shift from the design boresight direction.

Figure 5:
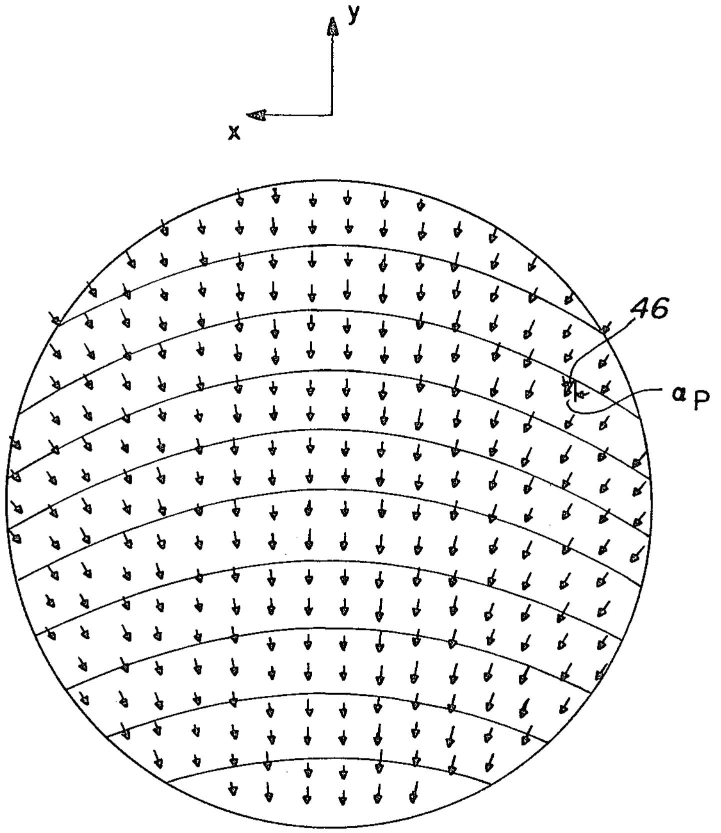
FIG. 5 is an illustration of the polarizations of each element of the feed array to compensate for the induced cross polarization at the selected elevation angle of FIGS. 2*a* and 2*b*.

Tracking errors caused by depolarizing targets and dome polarization distortion can be minimized by substantially eliminating the cross polarized components in the far field radiation pattern of the dome antenna. This may be accomplished by transmitting a signal from each element of the feed array at the polarization that is orthogonal to the polarization component at that element generated by a wave incident to the dome at a polarization that is substantially parallel to the undesired cross polarization. The orientation of the polarization vector at each element is synthesized by the inverse mapping technique illustrated in FIG. *4a* and FIG. *4b*. The area within the perimeter 42 of the effective aperture in FIG. *4b* represents the projection of the feed array aperture onto the effective aperture plane for scan angles $\theta_s=\phi_s=0°$. Lines 41*a* through 41*n* within the projected aperture perimeter 42 represent the $E_{74}$ field component, the desired orientation of the principle polarization in the far field, while lines 43*a* through 43*n* represent the $E_\phi$ field component, the undesired cross polarized component in the far field. These orthogonal field lines are mapped through the dome onto the surface of the feed array with ray tracing techniques to obtain the projected polarization pattern in the plane of the feed array, as shown in FIG. *4a*, wherein the lines 44*a* through 44*n* are the projections of the lines 41*a* through 41*n*, respectively, and the lines 45*a* through 45*n* are the projections of the lines 43*a* through 43*n*, respectively. Polarization vectors at various elements in the feed array aperture are shown in FIG. 5. The cross polarized component $E_\phi$ in the far field may be minimized by aligning the polarization of each element in the feed array to be orthogonal to the projected cross polarized field at the element location. Since propagation through the dome is reciprocal, the polarization when the elements are radiating, will be reoriented to establish a field linearly polarized with the desired principal polarization.

Figure 6:
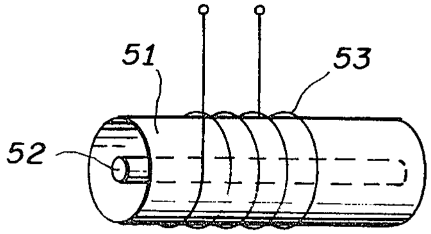
FIG. 6 is a schematic diagram of a Faraday rotator.

Each arrow in FIG. 5 as for example arrow 46, represents the orientation of the polarization vector at an element of the feed array during transmission and represents the rotation angle of the polarization vector relative to the Y axis of the feed array. As previously stated, polarization configuration of FIG. 5 have been generated for a specific elevation and azimuth scan angle. To obtain the polarization rotation angle $\alpha'_p$ for another azimuth scan angle, at the same elevation scan angle, the rotation angle relative to the Y axis is altered in accordance with:

$$\alpha'_p=\alpha_p+\phi'_s-\phi_s$$

where $\alpha_p$=polarization vector angle from Y-axis for the original scan angle $\phi_s$=original scan angle $\phi'_s$=new scan angle A variable polarization with scan angle may be obtained for each element with the ultization of a circular radiating element 51 having an axial ferrite rod 52 inserted therein to form a Faraday rotator, a device well known in the art, as shown in FIG. 6. The magnetization bias which controls the polarization of the device is generated by a current generated in the polarization control unit 18 (FIG. 1) that is coupled through a coil 53. Altering this current alters the magnetization bias thereby altering the element polarization. It is well known that Faraday rotators are not restricted to circular configurations and that a rectangular waveguide may also be utilized to control polarization of the radiated signal from each element.

Figure 7:
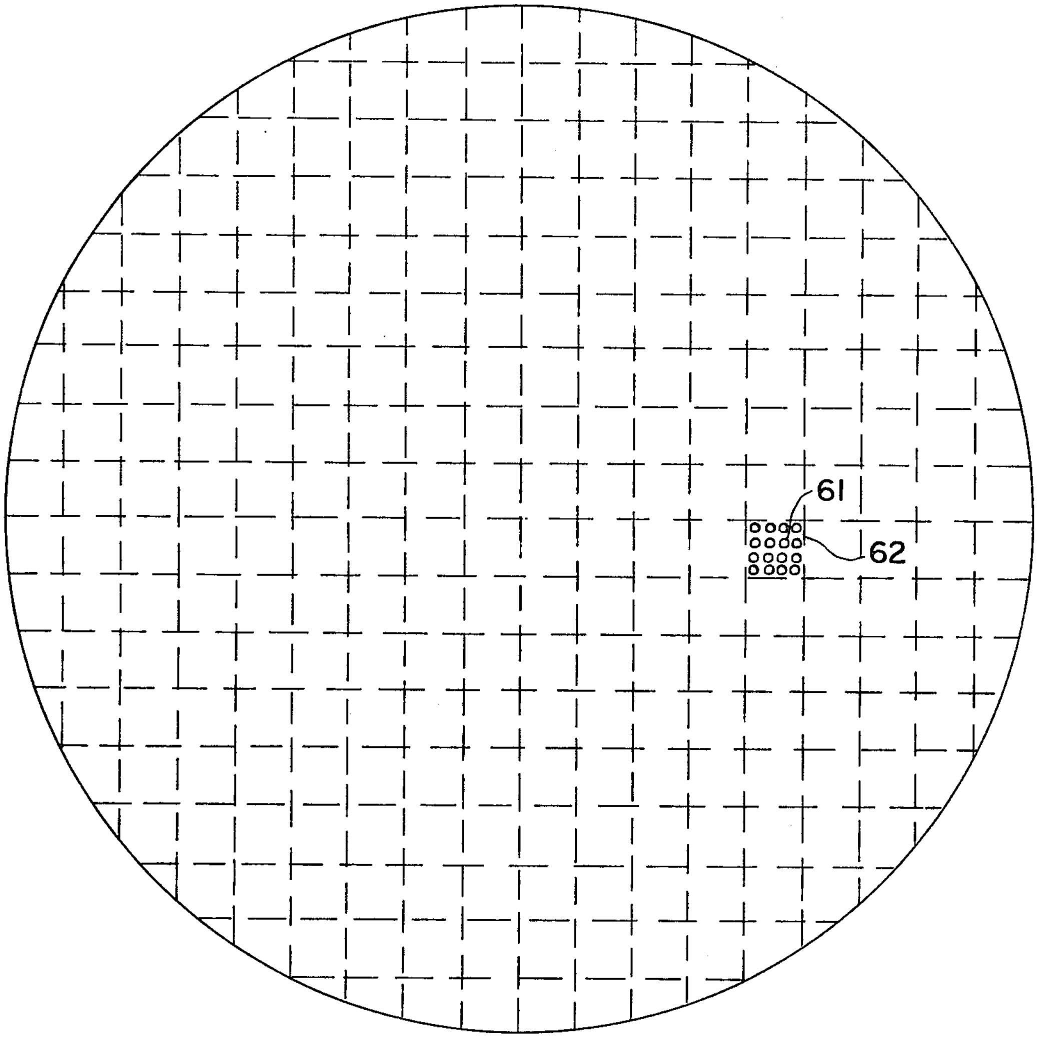
FIG. 7 illustrates the division of the feed array into a multiplicity of sub-arrays.

Individual element polarization control requires an expensive and complex polarization control unit 18 in FIG. 1. To reduce the cost and complexity of the polarization control unit 18 the feed array may be divided into a multiplicity of subarrays as shown in FIG. 7. Polarization for each scan position at the central element, such as element 61, in a subarray comprising the elements within a region such as region 62, is determined in the manner previously described. Faraday rotator coils for the individual elements in each subarray may then be coupled to the polarization control unit 18 to establish a radiation signal polarization vector that is substantially parallel to the radiation signal polarization vector of the central element in the subarray. This permits a single polarization control module for a multiplicity of antenna elements without substantially adversely affecting the overall performance of the antenna system While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A method of rendering an antenna system that includes a feed array of elements in energy coupling relationship with a nonplanar lens substantially insensitive to polarization components of received signals that are orthogonal to a predetermined polarization orientation comprising the steps of:

establishing a wave front incident to said non-planar lens, said plane wave front having a linear polarization that is orthogonal to said predetermined polarization orientation;

mapping said linear polarization onto said feed array;

determining polarization orientations at each of said elements resulting from said mapping; and orientating polarizations of said elements to be orthogonal to said determined polarization orientations.

2. A method of rendering an antenna system substantially insensitive to cross polarization components of received signals in accordance with claim 1 wherein the step of determining polarization orientations includes:

determining polarization orientation at selected elements of said feed array;

dividing said feed array in subarrays each having one of said selected elements therein;

orienting each element polarization in a subarray to be substantially parallel to said polarization orientation of said selected element therein.

3. In an antenna of the type including a feed array having reciprocal elements and a nonplanar reciprocal lens that establishes an internal space wherein the feed array is positioned and an external space, the feed array and lens cooperating to provide an electromagnetic energy coupling relationship along selected directions in the external space, the improvement comprising:

means coupled to said elements of said feed array for polarizing said elements orthogonally to polarizations established at said elements when electromagnetic waves with predetermined polarizations are incident to said lens from said selected directions in said external space, such that said antenna is rendered substantially insensitive to waves with said predetermined polarizations propagating in said external space and incident to said antenna from said selected directions.

4. An antenna in accordance with claim 3 wherein said polarizing means includes:

ferrite rods inserted in said elements for establishing polarizations of said elements as a function of magnetization bias applied to said ferrite rods; and coils wrapped about said elements and coupled to receive current for varying said magnetization bias of said ferrite rods thereby causing said polarizations to vary as a function of said current.

5. An antenna in accordance with claim 3 wherein said feed array is divided into subarrays, each subarray having a plurality of elements coupled to said polarizing means such that all elements in a subarray have substantially equal polarization.

* * * * *